E. D. KENDALL.
PROCESS OF REFINING HYDROCARBONS.
APPLICATION FILED APR. 29, 1912.
1,154,516.
Patented Sept. 21, 1915.
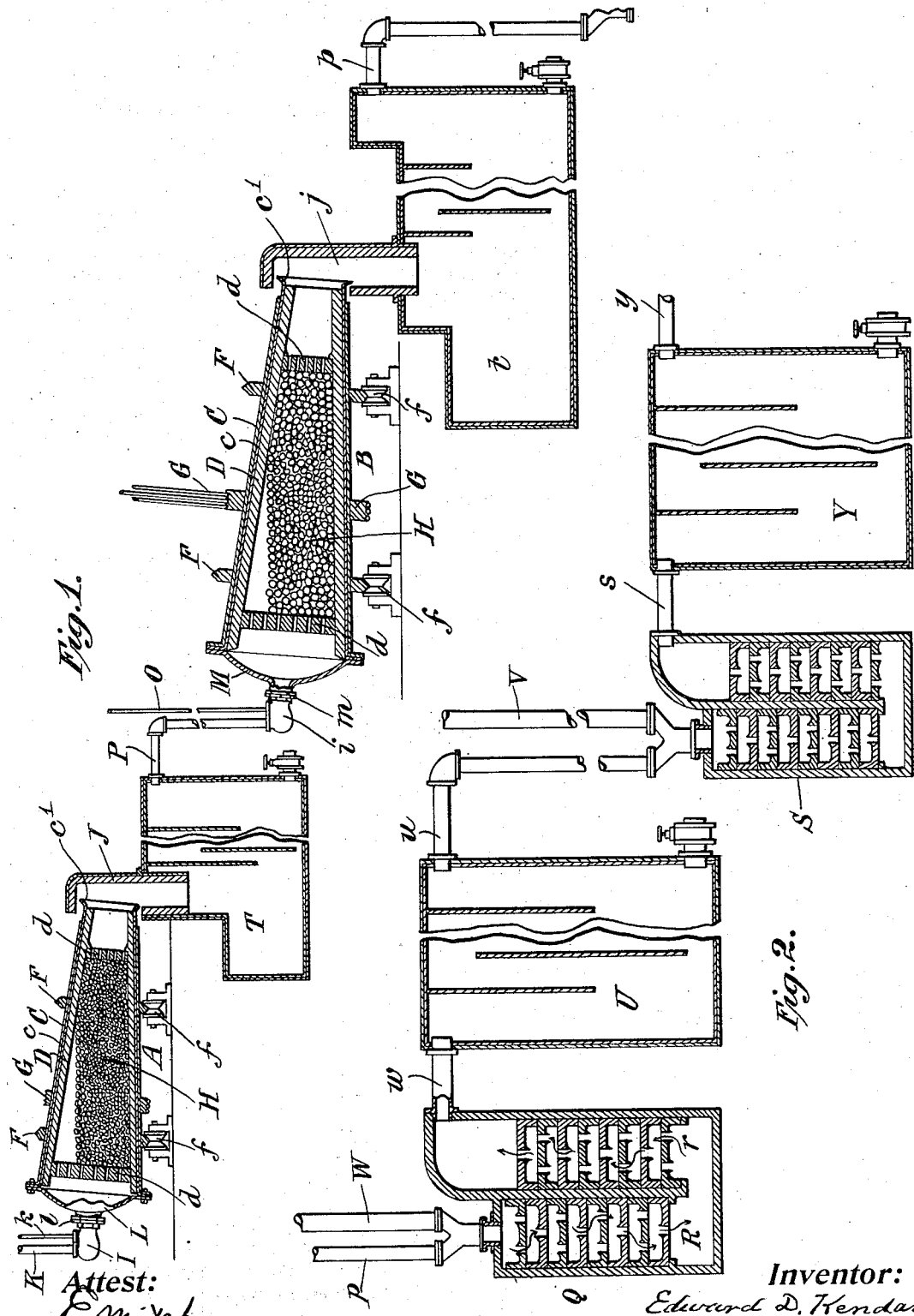
Attest:
Inventor:
Edward D. Kendall

UNITED STATES PATENT OFFICE.

EDWARD D. KENDALL, OF ELIZABETH, NEW JERSEY, ASSIGNOR OF ONE-THIRD TO LOUIS T. HAGGIN, OF CLOSTER, NEW JERSEY, MARGARET V. HAGGIN AND ALLAN McCULLOH, OF NEW YORK, N. Y., AND H. ESK. MOLLER, OF MONTCLAIR, NEW JERSEY, EXECUTORS OF JAMES B. HAGGIN, DECEASED, AND ONE-THIRD TO ESTATE OF WILLIAM A. MEGRATH, OF BROOKLYN, NEW YORK.

PROCESS OF REFINING HYDROCARBONS.

1,154,516.  Specification of Letters Patent.  Patented Sept. 21, 1915.

Application filed April 29, 1912. Serial No. 694,018.

*To all whom it may concern:*

Be it known that I, EDWARD D. KENDALL, a citizen of the United States, residing at Elizabeth, in the county of Union and State of New Jersey, have invented certain new and useful Improvements in Processes of Refining Hydrocarbons, of which the following is a specification.

My invention relates to improvements in processes of refining liquid hydrocarbons, particularly the distillates from crude petroleum, by means of sulfuric acid and other agents and the objects of my invention are, first, to provide a time-saving, continuous and effective process of refining, requiring comparatively little mechanical power and by which the action of the refining agents may be regulated and equalized, and, second, to avoid the use of driven currents of air as a means of agitating and commingling the hydrocarbons and refining agents, which air conveys moisture to the acid, which greedily absorbs the moisture and thereby has its efficiency as a refining agent greatly reduced, and which air forms explosive mixtures by taking up hydrocarbon-vapors and which method of treating with forced currents of air is attended with the further disadvantage that in treating a large volume of hydrocarbon (referring, particularly, to the crude burning oil so-called "distillate") with sulfuric acid, the portions of the hydrocarbon first chemically and sufficiently acted on by the acid are again and repeatedly subjected to contact with the acid in order to completely treat the succeeding and later portions of the hydrocarbon, so protracting the time required for agitation, and the said first portions of the hydrocarbon, so "overtreated," acquiring darker color, tend to discolor the entire body of the refined hydrocarbon.

I will first describe a plant or apparatus adapted for carrying out my process; this plant or apparatus is illustrated by the accompanying drawing, in which—

Figure 1 is a vertical section of the essential parts of the plant, and Fig. 2 is a vertical section of the washing and settling parts of the plant.

In the drawing, A and B (Fig. 1) represent two vessels preferably of conical form and similar in all essential respects: these vessels may be made of any suitable material; for small operations they may be made of chemical stoneware or crude porcelain, but the plant illustrated in the drawing is intended for large operations and the vessels A and B may be constructed as shown, C and C being outer shells of heavy steel or iron plate and c and c inner linings of sheet lead and D and D innermost thick linings of chemical stoneware, or crude porcelain, or other suitable material; the thick perforated end pieces d, d, d, d, may be made of the same material as D, D, or other suitable material. Attached to the outside of the shells, C and C are heavy hoops of iron, F, F, F, F, resting in grooves in the peripheries of the rollers indicated by f, f, f, f, which support the vessels A and B and contents thereof.

The vessels A and B, as shown in the drawing, are mounted so that the longitudinal line of the bottom of each is parallel with the level floor, platform, or concrete foundation on which the vessel stands.

The vessels A and B are nearly filled with balls, or rounded pieces, which I will herein refer to as balls, H, H, of chemical stoneware, or glass, or crude porcelain, or other suitable material, the sizes of these balls to be proportioned somewhat to the interior dimensions of the vessels A and B, which vessels are rotated by means of the attached rope-pulleys G and G, for which flanged belt-pulleys, or gearing, may be substituted, if required.

The vessels A and B having been charged with the proper respective quantities of the movable balls, H, H, that is to say quantities that will nearly fill the interiors of the said vessels and leave room for pervading movements of the masses of balls when the vessels A and B are rotated, the lead-lined covers L and M are to be bolted over the larger ends (as shown in the drawing) of the vessels A and B; extending from the center of each of these covers is a tubular stuffing box, *l* and *m*: a short lead-lined pipe, I, closed at its outer end (as shown in the drawing) passes through the stuffing box *l*. (The packing in the stuffing boxes may be a composition of soft asbestos, graphite and paraffin). The pipe 1 receives the outlet-ends of the pipe K and the much smaller pipe k.

The smaller and open ends of the rotating vessels A and B enter respective hoods which are the upper parts of the funnels J and j (these may be made entirely of chemical stoneware or porcelain). The lead-linings of the iron or steel shells of A and B, project beyond the said open ends and are turned outward to form flanges, as shown at c', c'. The lower part of each of these funnels enters an opening in the cover of a lead-lined settling-tank, T and t, made of steel or iron, which two tanks are alike, excepting that t may be larger than T; each of these tanks is provided with a lead-lined outlet pipe P and p, leading from its upper part and with a lead-lined outlet valve and pipe near the bottom; the outlet pipe P finally enters the short pipe i which is like the pipe I and passes through the stuffing box m delivering into the vessel B; a much smaller pipe, O, also enters and delivers into the short pipe i.

The outlet-pipe p, leading from the tank t, connects with a pipe W, (Fig. 2), both pipes delivering into a closed vessel, Q, having two compartments, R and r, the dividing partition between which is open only near the bottom of the said vessel, there providing communication between the two compartments; in each of these compartments are perforated disks or diaphragms, in R and r, all constructed and arranged to act as baffle-plates. The vessel Q may have more than two compartments, all equipped with baffle-plates correspondingly arranged and may be made of any suitable material or materials; it may be made of chemical stoneware, all in one piece of material including the baffle-disks, or it may be made of iron or steel plates, lined with lead, and the perforated disks may be made of chemical stoneware or porcelain, or of lead hardened with a small percentage of antimony. The baffle-disks should, preferably, be made with such projections from one surface of each as shall increase the agitation of liquids passing through the vessel Q and the projections on the disks in R, the first compartment of the said vessel, should extend upward, the projections on the disks in r, the second compartment, extending downward. Liquids entering the vessel Q must pass downward through the first compartment and upward through the second compartment in order to escape from the said vessel through the outlet-pipe w; this pipe w conveys such liquids into a lead-lined settling tank, U, constructed in all respects like the settling tanks T and t, excepting that it may be larger than either. (Before transference to the tank U the liquids may be conveyed from the vessel Q through a second connected vessel like Q, similarly constructed and equipped with baffle disks, or through a series of such vessels, if required). The outlet-pipe w, extending from the upper part of the tank U, finally connected with the pipe V, both pipes delivering into a closed vessel, S, which is constructed, and equipped with baffle disks, in all essential respects like the vessel Q. (Two or more such vessels may be connected together in series.) The outlet-pipe s from the vessel S delivers finally into a settling tank Y, constructed like the tanks T, t, and U excepting that it need not be lined with lead. The outlet-pipe y, near the upper part of the tank Y conducts to a tank for the storage of liquid.

I will now describe my process for the continuous refining of hydrocarbons by means of my plant or apparatus thus shown and described, taking as the most important hydrocarbon, in this connection, the so-called "distillate", or crude burning oil from petroleum.

Referring to the drawing, the distillate is continuously conveyed by the pipe K into the pipe I and the rotating vessel A while the smaller pipe k continuously conveys a regulated small proportion of concentrated sulfuric acid into the pipe I and the vessel A; both liquids pass together through the vessel A and from this vessel into the hooded funnel J; during this passage the rotation of the vessel A and the moving, rolling, obstructing action of the balls within that vessel combine to carry the sulfuric acid to the upper and all parts of the interior of the vessel A and thoroughly commingle the acid and distillate, even with forcible contact: the rolling motion of the balls smears them with acid and also so smears the interior of the vessel A, thus enormously increasing the area of contact of the acid with distillate. The liquids, filling the interstices of the balls and all interspaces within the vessel A, acting as lubricant, prevent material attrition and, serving as a cushion, prevent injurious impacts of the balls against the innermost lining of the vessel A.

The object of this first step in my process is not so much chemical action of the very small proportion of sulfuric acid used as it is to deprive the distillate of accompanying moisture by the strong affinity of concentrated sulfuric acid for water; the proportions of sulfuric acid used will vary with the different percentages of water carried by the different bodies of crude distillates.

From the vessel A the liquids pass through the funnel J into the settling tank T where the sulfuric acid, with associated matter, quickly subsides and passes out of the tank through the valve and pipe near the bottom of the tank, while the partially treated distillate rises and passes out of the tank through the outlet-pipe P which pipe finally and continuously delivers this distillate into the short pipe $i$, and the rotating vessel B: the pipe O continuously conveys a second supply, in much larger proportion, of sulfuric acid, delivering the same into the vessel B, where the real chemical action of the sulfuric acid on the distillate occurs.

Under the conditions before described, with reference to the vessel A, viz: the thorough commingling of the two liquids by the rotation of the vessel B and by the obstructing, mixing and rubbing action of the rolling balls therein, the acid being smeared over the moving balls and the innermost surfaces of the vessel B, the distillate is subjected to intimate, thorough and forcible contact with the sulfuric acid over a very large area during its continuous flow through the vessel B. The liquids escape from this vessel B and through the funnel $j$ into the lead-lined tank $t$ from which the sulfuric acid, with combined matter ("sludge acid"), passes out through the adjusted valve and connected pipe near the bottom of said tank, while the acid-treated distillate escapes through the pipe $p$ which pipe connects with the pipe W (Fig. 2) through which flows a continuous current of water, for washing the distillate, in volume preferably greater than the volume of the distillate continuously delivered by the pipe $p$: both liquids pass together into the vessel Q. While passing through the first compartment, R, of the vessel Q the liquids flow tumultuously downward through the baffle-disks therein and when passing through the second compartment, $r$, the flow is upward through the contained baffle-disks, this reversed movement of the water and distillate reversing the tendency to precedence in natural movement due to the different gravities of the two liquids. From the vessel Q the washed distillate and water pass through the outlet pipe $w$ into the lead-lined settling tank U: the water subsides and flows out of the tank through the adjusted valve and the pipe near the bottom of the tank and the distillate passes out through the pipe $u$ which pipe connects with the pipe V through which flows a continuous current of solution of alkali (preferably of sodium hydroxid, because of its cheapness) and both distillate and alkaline solution are conducted into the vessel S which is constructed in all essential respects like the vessel Q excepting that it may be of somewhat smaller dimensions; in this vessel S the alkaline solution removes the last traces of acid from the distillate. From the vessel S the distillate and alkaline solution pass through the pipe $s$ into the settling tank Y from which the alkaline solution flows out through the valve and pipe near the bottom of the tank and the distillate (now "refined oil") passes out through the pipe $y$ and is conveyed, by means of pumps or otherwise, to a storage tank or tanks. Should it be desired to give the "refined oil" a final washing with water this may be done by the use of one or more vessels like Q and S and another settling tank like Y, but this additional treatment is not necessary. Should it be desired to treat the "refined oil" finally with so-called fullers' earth, or other similar agent this may be done by the known methods before or after storage.

Having thus described my process, what I claim is:—

1. The process of refining liquid hydrocarbons which consists in bringing together regulated quantities of the hydrocarbon and sulfuric acid, smearing the mixture over regulated and restricted surfaces, bringing said smeared surfaces into forcible contact with each other, thereby causing the acid and distillate to thoroughly commingle together.

2. The process of refining liquid hydrocarbons which consists in bringing together regulated quantities of the hydrocarbon and sulfuric acid, causing regulated and restricted amounts of the said mixture to be forcibly thrown together to thoroughly commingle the ingredients of the mixture.

3. The process of refining liquid hydrocarbons which consists in causing regulated quantities of hydrocarbon and sulfuric acid to be brought together and to be spread upon regulated and restricted surfaces, said surfaces being forcibly brought together, thereby commingling the acid and distillate, separating the hydrocarbon from the acid, passing the hydrocarbon mixed with water downward then upward to thoroughly commingle the same, separating the water from the hydrocarbon, feeding the hydrocarbon so separated with a solution of alkali by causing the mixture of hydrocarbon and alkali to flow downward and then upward in contact with each other.

4. The process of refining liquid hydrocarbons which consists in bringing together regulated quantities of the hydrocarbon and sulfuric acid, spreading the mixture upon regulated and restricted surfaces, rubbing said surfaces together, partially separating the sulfuric acid from the hydrocarbon, collecting the distillate so treated and mixing the same with a second supply ofsulfuric acid, spreading said mixture upon regulated areas and bringing said surfaces in contact with one another to commingle the same and then separating the sulfuric acid from the hydrocarbon.

5. The process of refining liquid hydrocarbons which consists in bringing together regulated quantities of the hydrocarbon and sulfuric acid, spreading the mixture upon regulated and restricted surfaces, causing the said surfaces to forcibly contact with one another, to partially commingle the acid with the hydrocarbon, partially separating the sulfuric acid from the hydrocarbon, bringing together the partially treated distillate with a second supply of sulphuric acid, spreading the said mixture upon regulated and restricted surfaces, forcibly bringing said surfaces into contact, separating the sulfuric acid from the distillate, passing water into the distillate, causing the mixture to move downward and then upward to thoroughly commingle the same and then separating the water from the hydrocarbon.

6. The process of refining liquid hydrocarbon which consists in bringing together regulated quantities of the hydrocarbon and sulfuric acid, causing the said mixture to be spread over regulated and restricted surfaces, causing the said surfaces to be forcibly brought together to commingle the hydrocarbon and sulfuric acid, partially separating the sulfuric acid from the hydrocarbon, bringing together the partially treated distillate with a second supply of sulfuric acid, spreading the said mixture over regulated and restricted surfaces, forcibly bringing said surfaces into contact to commingle the acid with the distillate, separating the acid from the distillate, passing water into the distillate, causing the said mixture to move downward then upward to thoroughly commingle, separating the water from the distillate and then treating the separated distillate with a solution of alkali, finally separating the alkali from the distillate.

EDWARD D. KENDALL.

Witnesses:
  D. A. DAVIES,
  GEO. W. JAEKEL.